United States Patent [19]
Ide et al.

[11] Patent Number: 5,727,926
[45] Date of Patent: Mar. 17, 1998

[54] PITCH LINK FOR ROTARY WING AIRCRAFT AND AUTOMATIC ADJUSTER THEREOF

[75] Inventors: Hideaki Ide, Gifu; Shunichi Bandoh; Hiroshi Yasuhara, both of Kakamigahara, all of Japan

[73] Assignee: Kawasaki Jukogyo Kabushiki Kaisha, Kobe, Japan

[21] Appl. No.: 588,302

[22] Filed: Jan. 18, 1996

Related U.S. Application Data

[62] Division of Ser. No. 256,723, Jul. 22, 1994, Pat. No. 5,511,944.

[30] Foreign Application Priority Data

Nov. 25, 1992 [JP] Japan ................ 4-315389

[51] Int. Cl.⁶ ............................ B64C 11/44; B64C 27/68
[52] U.S. Cl. .................. 416/168 R; 416/114; 416/500; 74/581; 74/586; 74/606 R
[58] Field of Search .......................... 416/61, 113, 114, 416/168 R, 168 A, 500; 74/581, 586, 606 R; 244/17.27, 75 A; 267/242

[56] References Cited

U.S. PATENT DOCUMENTS

| | | | |
|---|---|---|---|
| 2,104,764 | 1/1938 | Sanders et al. | 74/586 |
| 3,736,010 | 5/1973 | Larkin | 416/61 |
| 3,782,220 | 1/1974 | Ditlinger | 74/581 |
| 3,786,695 | 1/1974 | Barrett, Jr. . | |
| 3,938,762 | 2/1976 | Murphy . | |
| 4,053,123 | 10/1977 | Chadwick . | |
| 4,498,842 | 2/1985 | Fischer et al. . | |
| 4,583,421 | 4/1986 | Rose | 74/586 |
| 4,611,971 | 9/1986 | Aubry et al. | 416/114 |
| 4,841,801 | 6/1989 | Tice | 74/581 |
| 5,242,130 | 9/1993 | Mouille et al. . | |

FOREIGN PATENT DOCUMENTS

| | | | |
|---|---|---|---|
| 0143111 | 10/1930 | France | 74/581 |
| 2757617 | 6/1979 | Germany . | |
| 59-22218 | 2/1984 | Japan . | |

*Primary Examiner*—Christopher Verdier
*Attorney, Agent, or Firm*—Leydig, Voit & Mayer, Ltd.

[57] ABSTRACT

A pitch link having an adjustable length is constructed as a diamond-shaped frame by coupling and fixing four flexible beams at end portions thereof. Spherical bearings are provided on opposite ends of the structure. A turnbuckle shaft is screwed into vertices of the structure and turned to the length of the pitch link. The turnbuckle shaft can be rotated by a detachable motor.

11 Claims, 15 Drawing Sheets

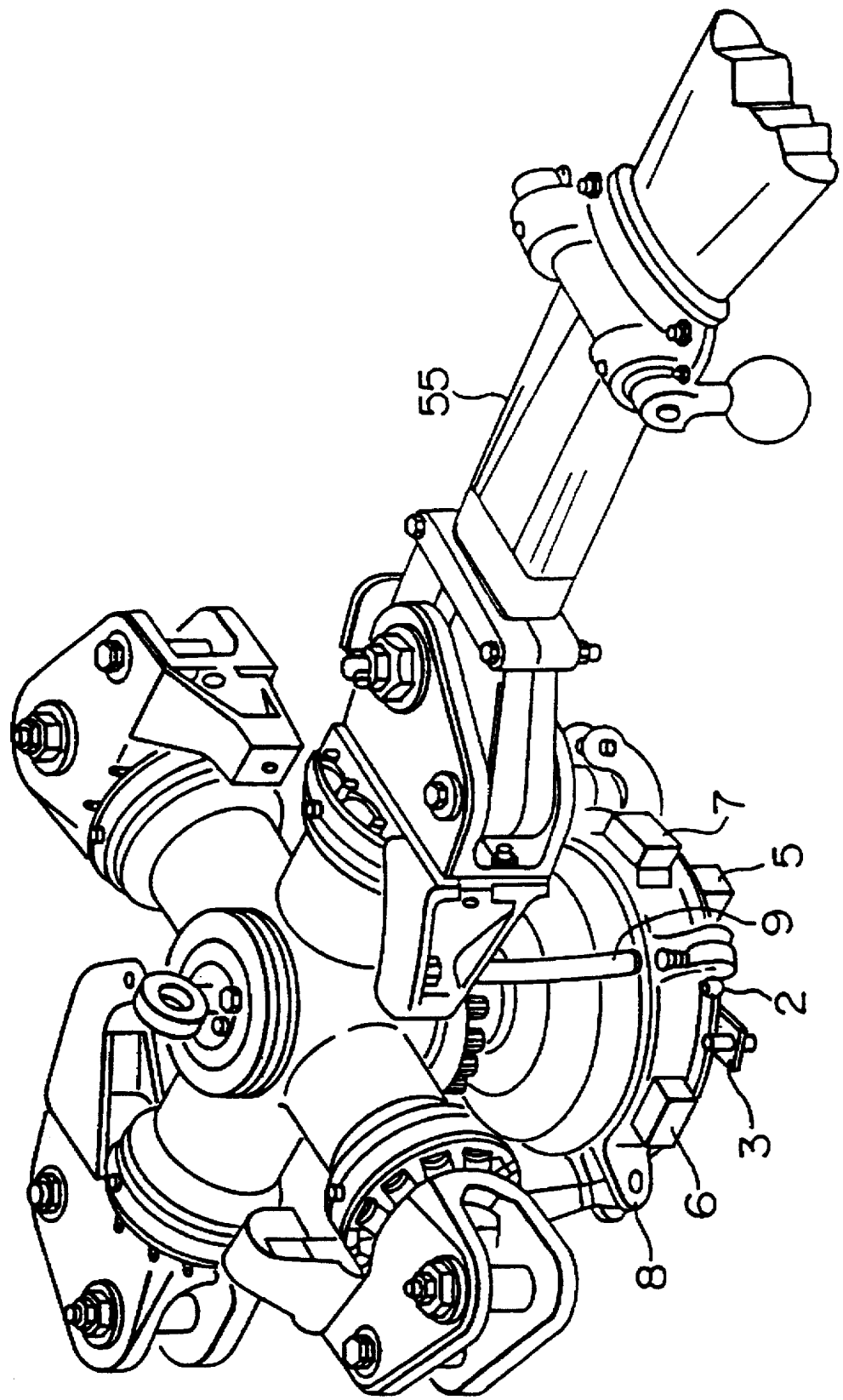

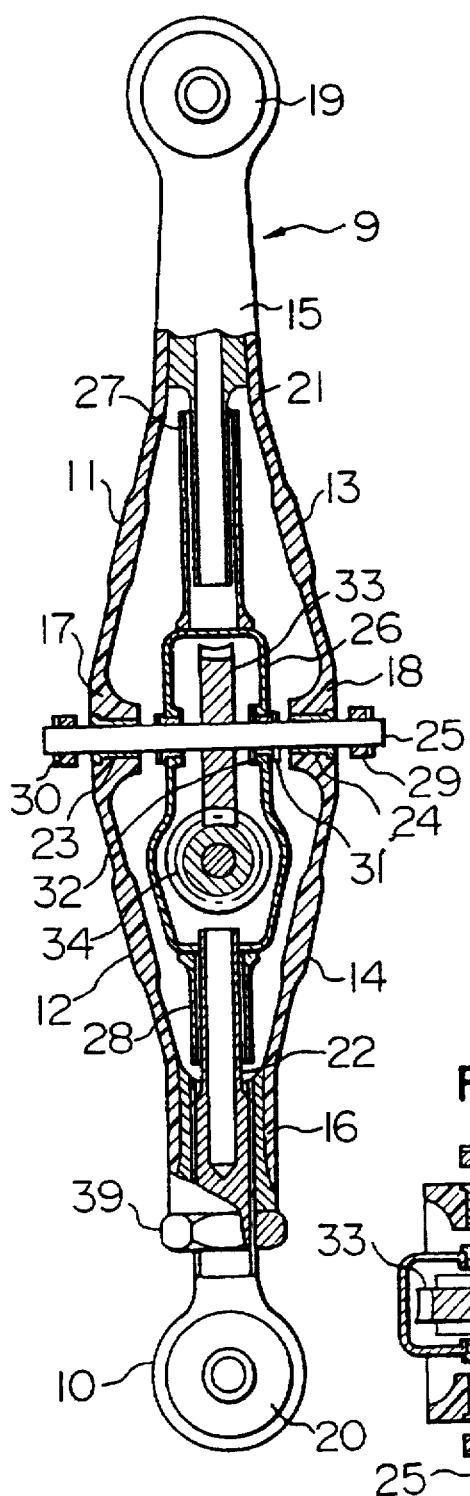
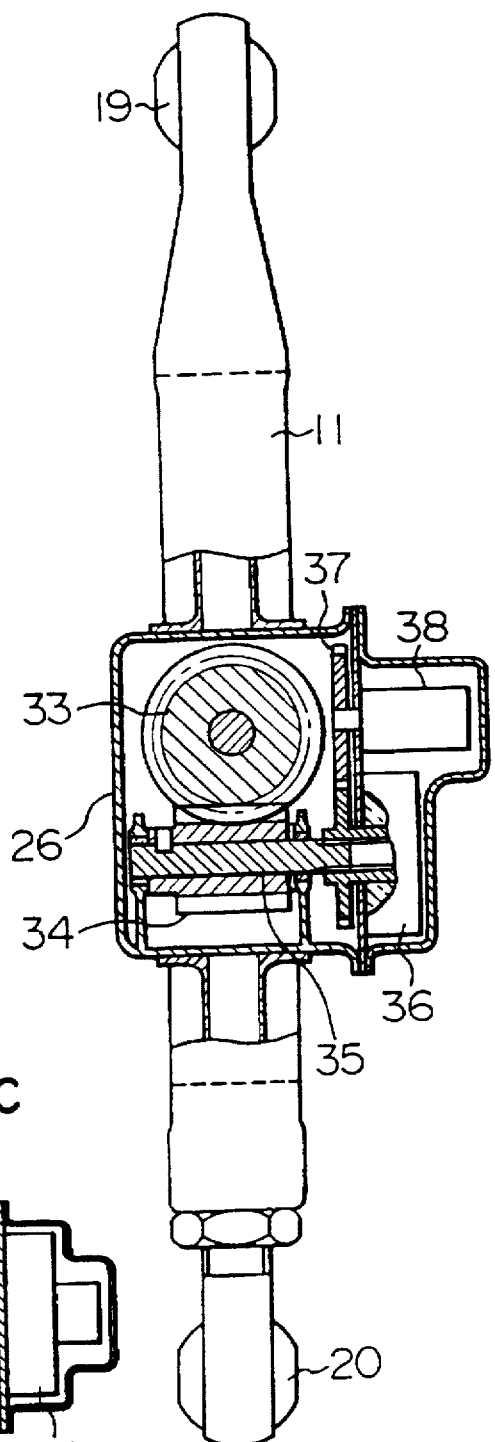
FIG. 3A
FIG. 3B
FIG. 3C

FIG. 8A
FIG. 8B
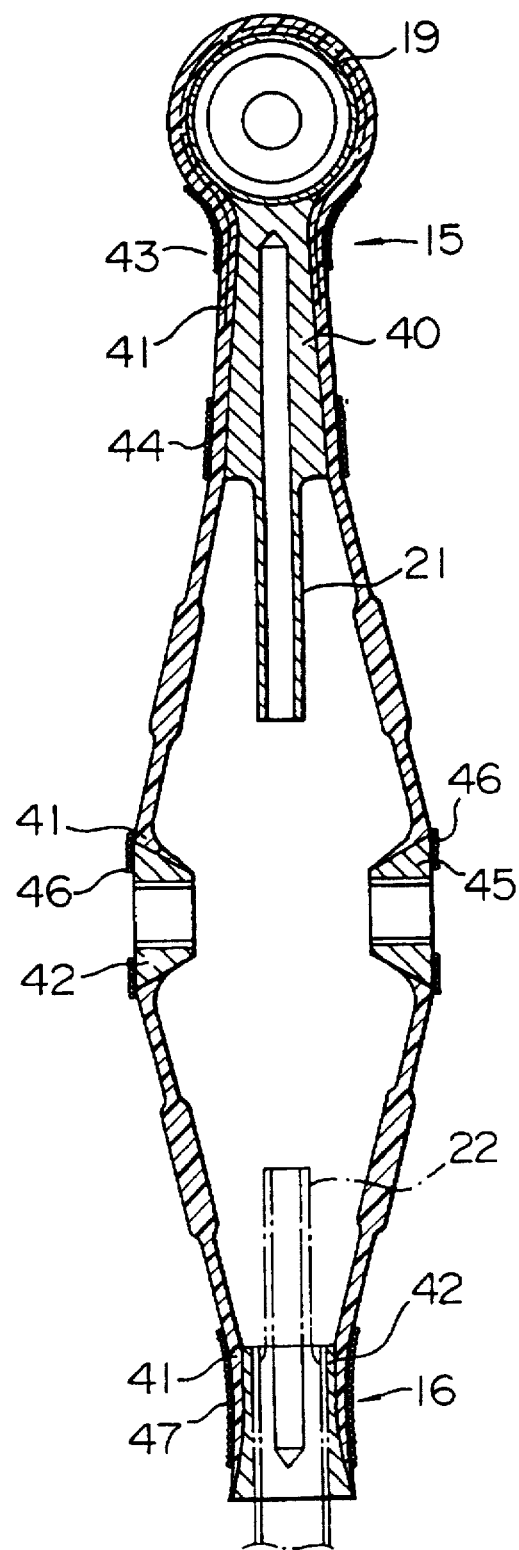
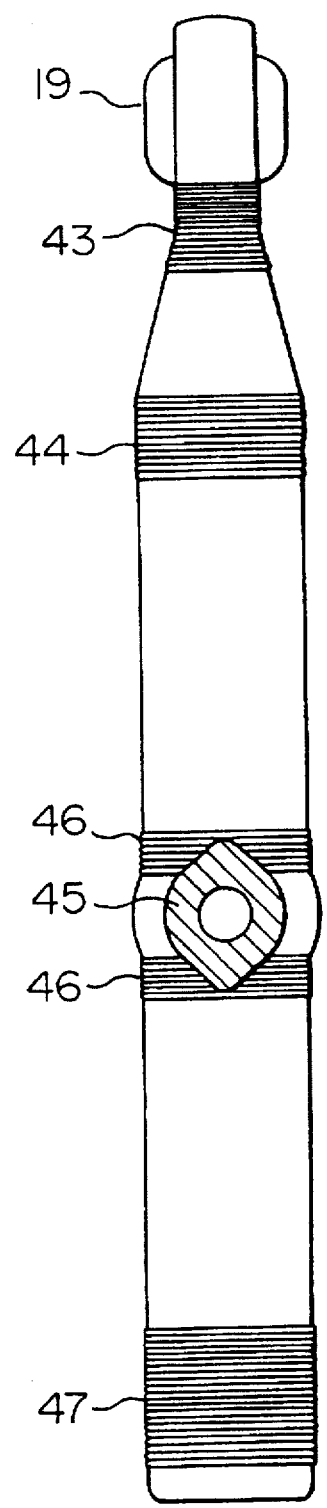

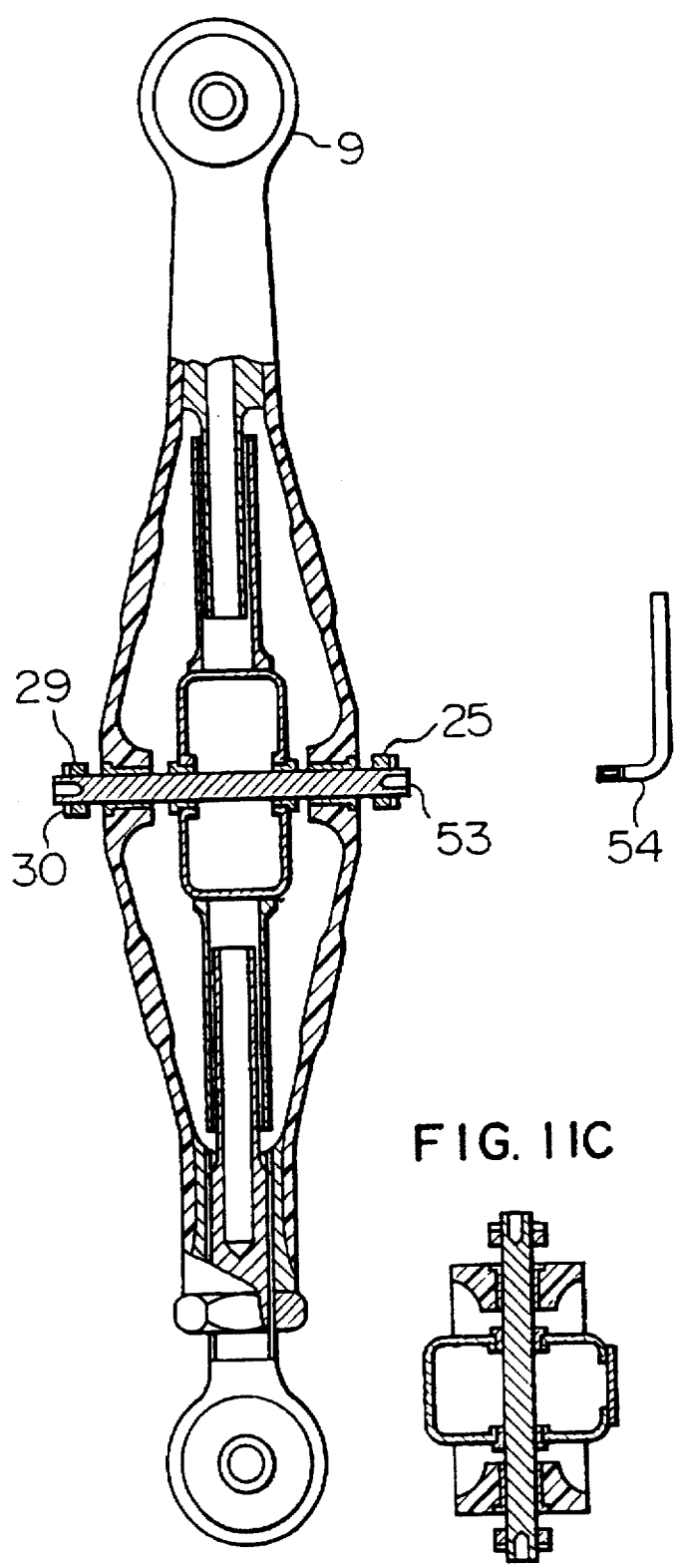
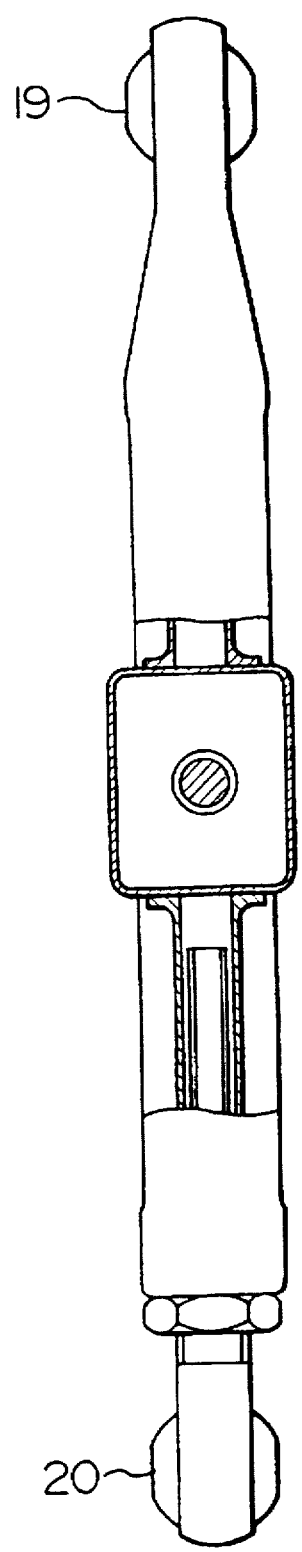
FIG. 11A
FIG. 11B
FIG. 11C

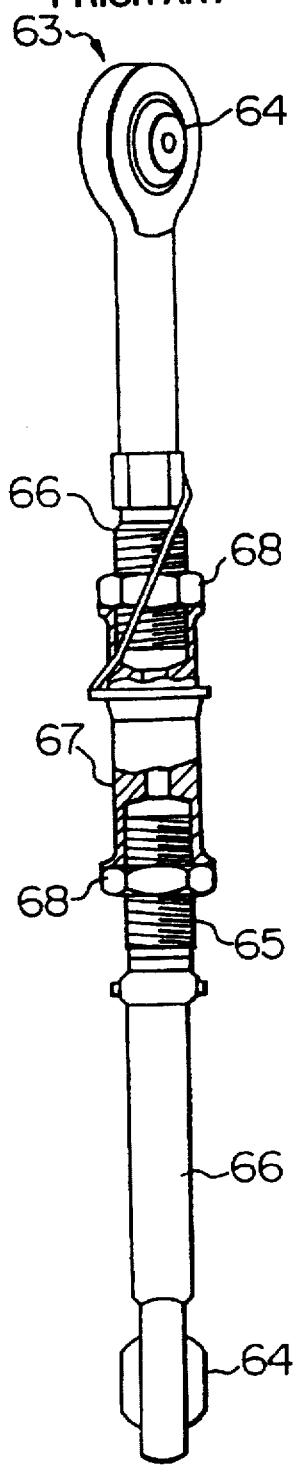
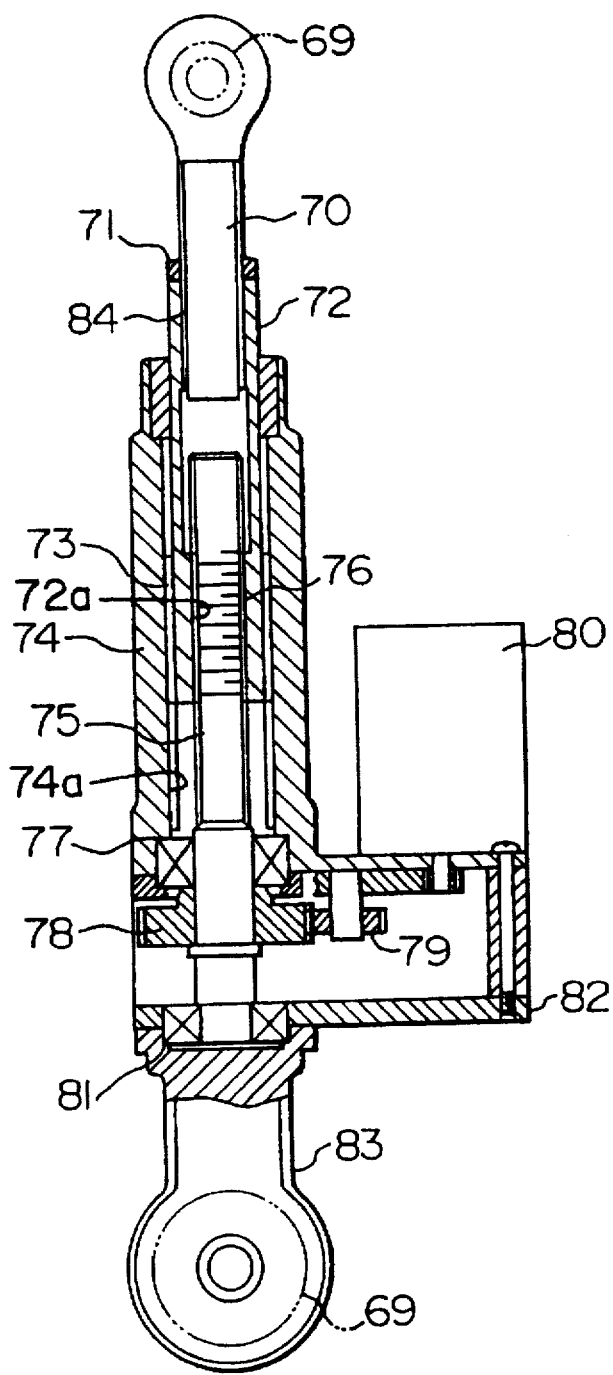
FIG. 13 PRIOR ART
FIG. 14

PITCH LINK FOR ROTARY WING AIRCRAFT AND AUTOMATIC ADJUSTER THEREOF

This disclosure is a division of patent application Ser. No. 08/256,723, filed Jul. 22, 1994 now U.S. Pat. No. 5,511,944.

TECHNICAL FIELD

The present invention relates to a pitch link for adjusting a pitch angle of rotor blades of a rotary wing aircraft (hereinafter called helicopter) and an adjuster operating therefor.

BACKGROUND ART

For adjusting a pitch angle of rotor blades of a helicopter, known hitherto is such a type of device as coupling a pitch link 63, as shown in FIG. 12, through spherical bearings provided on opposite end portions with a point of the nose portion of a pitch horn 62 of a pitch housing 61 provided projectingly from an end portion coming out of a pitch axis, which is fixed to a rotor blade 55 at its mounting end portion on a hub and supported on the hub 60 rotatably round the pitch axis, and a point corresponding thereto on a rotating ring 8 of a swash plate thus adjusting the length to adjust a pitch angle of the rotor blade 55.

FIG. 13 is a diagram representing a construction of one example of the prior art pitch link 63. As shown in this figure, the pitch link 63 comprises a pair of end rings 66 each having a spherical bearing 64 on one end and a thread running in the direction counter to each other on the other end. The end rings 66 are screwed into female screws counter to each other which are provided on opposite ends of a barrel rod 67. In order to adjust the length of the pitch link, a normal practice is that the barrel rod 67 is turned to perform fine adjustment of the length between the spherical bearings on both ends, and a lock nut 68 screwed onto the screw 65 of each end ring 66 is tightened and thus pressed against an end surface of the barrel rod 67 to fix the end ring 66 securely so as not to be loose against the barrel rod.

Meanwhile, vibrations of a helicopter are caused by an unbalance of a rotor, and, if such unbalance is excessive, then not only discomfort of passengers but also structural fatigue may unexpectedly be caused.

A decrease in vibrations of a helicopter has been attempted hitherto such that a deviation in path of the tip of rotor blades is measured on a strobotracker while flying, or a vibration level is measured on a vibrosensor, and based on the data obtained therefrom, when a rotation of the rotor is stopped after landing by a regulation indexed by chart or analyzer for the pitch link, a length of the pitch link is adjusted manually, and then the vibration level is ensured through reflying.

Due to a difference in flying conditions, a dispersion of the pitch link adjustment or other factors, flying is required 5 or 6 times normally until the vibration level settles at a required value or below, and in addition an imperfect adjustment may result in most cases.

Requirements for vibrations of the helicopter have become of late severer and severer, and thus how to decrease vibrations of the helicopter is regarded as one of the grave issues in the future. To satisfy such requirements according to the conventional method, the number of times of flights inevitably increases more than hitherto, and yet there is a limit for the fine adjustment due to a dispersion of the pitch link adjustment and so forth.

The dispersion of the pitch link adjustment may also be caused by a construction of the pitch link in which the length will be adjusted by a screw coupling of an end ring and a barrel rod. In the screw coupling, there is a play present between a male screw and a female screw, and hence when fixing each end ring by clamping the lock nut, a position where the end ring is fixed is shifted, even though it is minute, by a frictional force working between the screw surface and the lock nut surface according to such clamping, therefore it is difficult to adjust precisely the length of the pitch link, thus leaving a dispersion.

As mentioned hereinabove, 5 to 6 times of flights are required until the vibration level is decreased to a desired value or below, and still an adjustment will not satisfactorily be realized in most cases, however, a dispersion of the aforesaid pitch link adjustment is assumed to be one of substantial factors thereof.

DISCLOSURE OF THE INVENTION

In view of the aforementioned problems inherent in the prior art pitch link adjustment of a helicopter, the present invention makes it a subject matter to provide an automatic adjuster for pitch link which is capable of completing a pitch link adjustment by a flight effected one time only against arbitrary flying conditions while carrying out the pitch link adjustment automatically and continuously during the flight, and also a pitch link having a construction suitable for such automatic adjustment.

In solving the aforesaid subject matter, one construction of the present invention comprises fixing and coupling mutually at end portions four flexible beams each having equal length and rigidity to form a diamond-shaped frame, mounting the aforesaid spherical bearing on opposite pair of acute vertex portions, screwing and coupling opposite pair of obtuse vertex portions by a turnbuckle shaft having bilateral threads thereon.

Another construction of the pitch link according to the present invention comprises having a pair of shaft members provided extendedly on an axis combining rod ends on opposite ends which are provided with spherical bearings on opposite end portions each, and screwed each other by a screw mechanism with the axis as a shaft center, the one shaft member being coupled with the one rod end rotatably round the aforesaid axis and, at the same time, drivable by an electric motor through a mechanical reduction mechanism, the other shaft member being coupled fixedly with the other rod end.

Additionally, an automatic adjuster according to the present invention which is provided for solving the aforementioned subject matter has a vibrosensor for detecting vibrations of an aircraft body, a phase detector for detecting rotor phases, a vibration analyzer, an FM data transmitter/receiver and means for adjusting the length of a pitch link, which comprises calculating an amount for adjusting each pitch link on the vibration analyzer from electrical signals of vibration and rotor phase detected by the vibrosensor and the phase detector mounted on the aircraft body respectively while the aircraft is flying, converting it into an electrical signal, driving means for adjusting a length of the pitch link through the FM data transmitter/receiver, thus adjusting automatically the length of the pitch link.

According to the former construction of the pitch link of the present invention described as above, from rotating the turnbuckle shaft, a width in the transverse direction of the pitch link constructed as a diamond-shaped frame may be changed to adjust the axial length, however, since the turnbuckle shaft is screwed to coupling into obtuse vertex portions of the diamond-shaped frame, and an axis of the pitch link comes on the straight line connecting acute vertex portions of the diamond-shaped frame, a change in the axial length becomes smaller than the change in a crosswise length of the diamond-shaped frame according to rotations of the turnbuckle shaft, a fine adjustment of the pitch link length is facilitated, and a torque of the motor can be minimized. Moreover, a screw of the turnbuckle shaft can be minimized, therefore a dispersion of the pitch link adjustment will be minimized.

Besides, according to the latter construction of the pitch link of the invention, from turning one of the shaft members provided extendedly on an axis of the pitch link and screwed each other by an electric motor through the mechanical reduction mechanism, a length between opposite end portions of a pair of rod ends may be adjusted. If an epicyclic gear is intended to operate as the aforesaid mechanical reduction mechanism, then the operation will be smoothed to go and at the same time, the mechanical reduction mechanism and the electric motor may be provided on an axis of the pitch link. Further, if otherwise the aforesaid pair of shaft members are not screwed directly each other, but screwed to coupling through an intermediate shaft member having two screws screwable thereinto, and threads of the two screws are made to be of the same spiral direction but different in pitch, then the pitch link will shift by the difference of pitch per rotation, thus facilitating a fine adjustment.

Further, according to the construction of the aforesaid pitch link automatic adjuster, since the pitch link may continuously be set to an optimum length against the flying conditions while the aircraft is flying, the pitch link adjustment is completed at one time flight, and a vibration level may sharply be decreased. Besides, an even vibration level may be obtained irrespective of skill and number of times for adjustment of ground men.

During a practical use of aircraft for which a pitch link adjustment is not particularly required, an arrangement will be such that the aforesaid vibrosensor, vibration analyzer, FM data transmitter/receiver, motor functioning as a pitch link length adjusting means and its controller may be demounted, then these apparatuses are handled as ground backup equipment, and hence a high reliability is not so required, furthermore, the same set of apparatuses may be utilized for pitch link adjustment of a plurality of aircrafts, therefore the cost can sharply be decreased.

Subject matters of the present invention other than what has been described above and means for solving them will become apparent from the detailed description of embodiments taken with reference to the accompanying drawings.

BRIEF DESCRIPTION OF THE DRAWINGS

FIG. 2 indicates an enlarged portion II of FIG. 1, and is a perspective view representing the pitch link automatic adjusting system configuration of the present invention in conjunction with FIG. 1.

FIGS. 3A, 3B and 3C represent a construction of a first example of a pitch link according to the present invention, in which FIG. 3A is a longitudinal sectional view, FIG. 3B is a side view partly in section, and FIG. 3C is a transverse sectional view.

FIGS. 8A and 8B show a composite material built-up state of the pitch link of the present invention, in which FIG. 8A is a longitudinal sectional view, and FIG. 8B is a side view thereof.

FIGS. 10A, 10B and 10C represent a third example of the pitch link of the present invention each, in which FIG. 10A is a longitudinal sectional view, FIG. 10B is a side view partly in section, and FIG. 10C is a transverse sectional view thereof.

FIGS. 11A, 11B and 11C represent a fourth example of the pitch link of the present invention each, in which FIG. 11A is a longitudinal sectional view, FIG. 11B is a side view partly in section, and FIG. 11C is a transverse section view thereof.

FIG. 13 is a front view, partly in section, exemplifying a prior art pitch link construction.

FIG. 14 is a longitudinal sectional view representing a sixth example of the pitch link of the present invention.

BEST MODE FOR CARRYING OUT THE INVENTION

Figure 1:
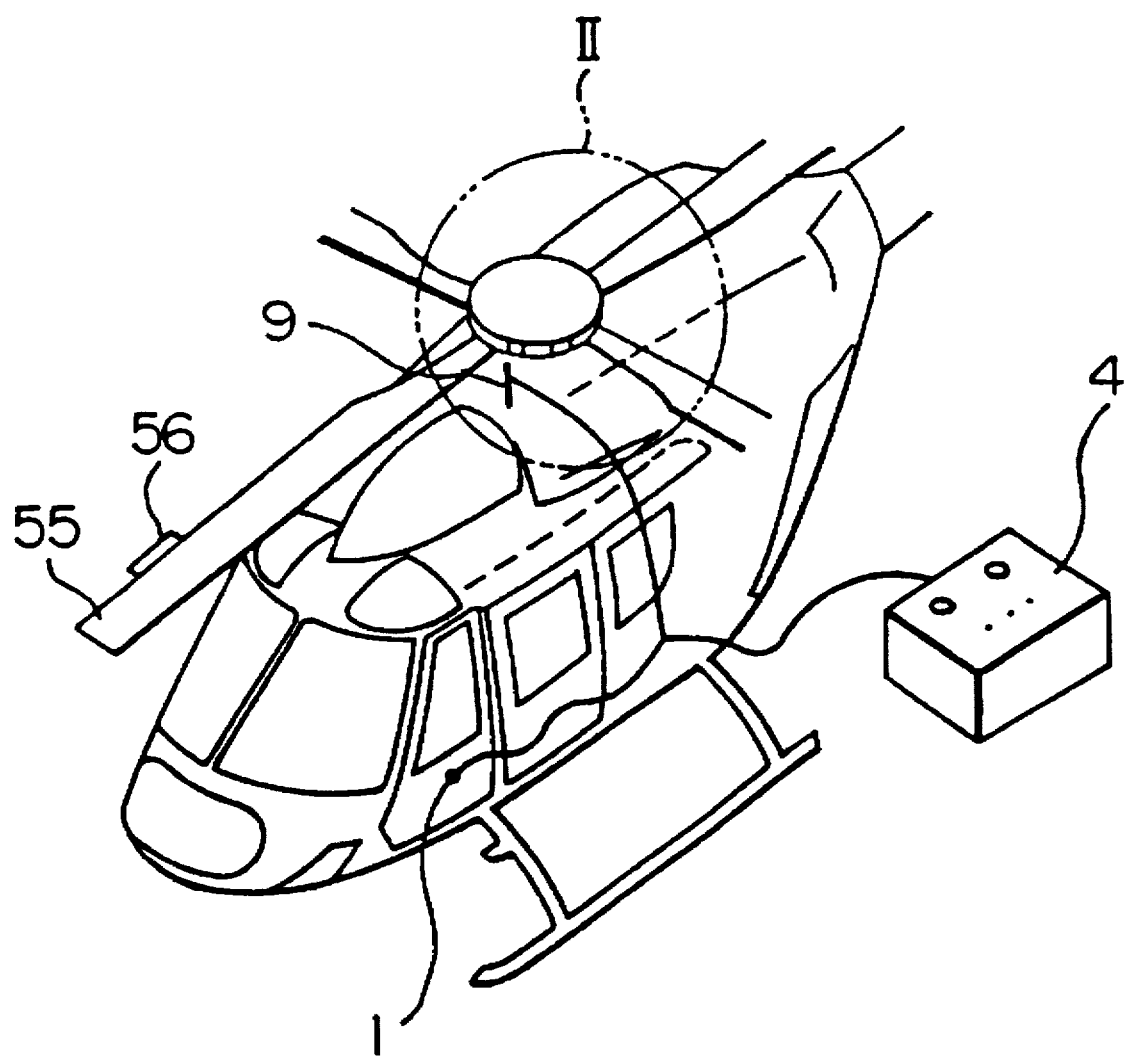
FIG. 1 is a perspective view representing a pitch link automatic adjusting system configuration according to the present invention.

Embodiments of the present invention will be described in detail with reference to the accompanying drawings.

<First Example>

A pitch link 9 according to this example is, as shown in FIGS. 3A, 3B and 3C, solid in structure made of composite materials which is formed into a diamond-shaped frame by coupling with each other and so fixing at end portions four flexible beams 11, 12, 13, 14 having a reinforcement rigid in bending strength centrally of the longitudinal direction and also having the same length and rigidity, and its construction is such that spherical bearings 19 and 20 are provided on a pair of acute vertex portions 15 and 16 respectively to take the longer diagonal line as a pitch link axis, nuts 23, 24 threaded to run counter to each other are embedded in an opposite pair of obtuse vertex portions 17 and 18, opposite end screws of a turnbuckle shaft 25 having bilateral threads on its opposite ends are screwed into them to coupling, and from rotating the turnbuckle shaft 25, the diamond-shaped frame is transfigured, and thus a length of the pitch link 9 is changed.

A worm wheel 33 is mounted fixedly to the turnbuckle shaft 25, and a worm 34 is engaged with and so mounted to the worm wheel 33 with the opposite ends supported rotatably on a holding box 26. A spline is formed on one end of a worm shaft 35, and an electric motor 36 is coupled to the worm shaft 35 through the spline. For detecting a rotational frequency of the motor 36, a rotational frequency detector 38 rotated through a gear train 37 is provided on a motor shaft.

Figure 6:
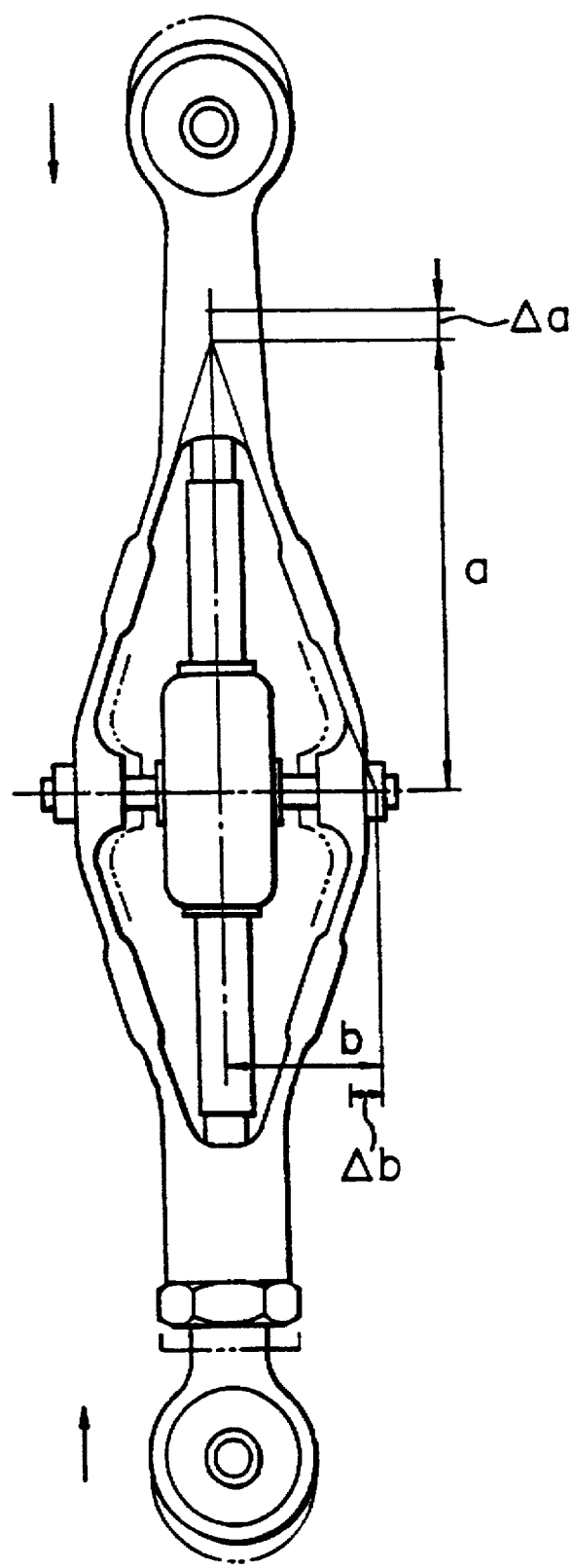
FIG. 6 is an explanatory drawing illustrating a principle of a pitch link adjustment of the present invention.

In accordance with the above-described construction, when the electric motor 36 is driven, and thus the turnbuckle shaft 25 is rotated through a worm gear consisting of the worm 34 and the worm wheel 33, the shorter diagonal line of the diamond-shaped frame is extended or contracted as shown in FIG. 6, and the longer diagonal line of the diamond-shaped frame is contracted or extended accordingly. That is, as indicated in FIG. 6, when the pitch link constructed as a diamond-shaped frame is expanded crosswise, the pitch link becomes short in length. In this case, let the half of a width of the diamond-shaped frame be b, and its displacement be Δb, then a displacement Δa of the half a of a length of the diamond-shaped frame is:

$$\Delta a = \Delta b \times \frac{b}{a} \quad (1)$$

thus, the greater an aspect ratio a/b of the diamond-shaped frame is, the less a ratio of variation of the pitch link length to the variation of width becomes.

Accordingly, from increasing the aspect ratio a/b of the diamond-shaped frame, the pitch link length may be adjusted precisely.

As described above, since the pitch link 9 has a member for supporting axial loads structured integrally with composite materials, the axial member is free from a lost motion, further the variation of the pitch link length adjustment is smaller, as described above, than the width variation due to a rotation of the turnbuckle shaft 25, therefore a load applied to the turnbuckle shaft 25 becomes smaller than the load applied to the spherical bearings 19 and 20 on the pitch link axis, and thus the diameter of thread of the turnbuckle shaft 25 can be minimized. Accordingly, a lost motion of the screws of the turnbuckle shaft will be minimized. These synergisms permit an accurate fine adjustment of the pitch link length, and thus even in case the adjustment is carried out according to the conventional method of trial and error, the number of times of flights for reducing vibrations of the helicopter may be minimized in consequence.

Figure 7:
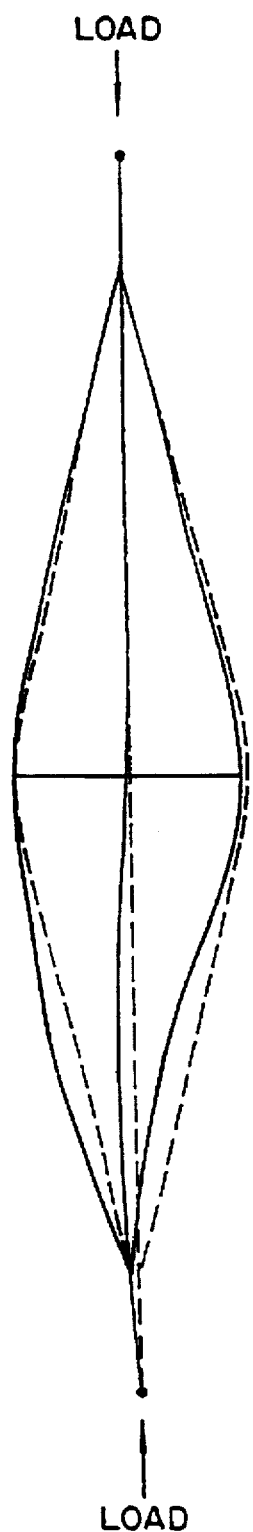
FIG. 7 is an explanatory drawing indicating buckling modes in comparison where a support along an axis of the pitch link of the present invention is present or not present.

In the example shown in FIGS. 3A, 3B and 3C, the diamond-shaped vertex portions 15 and 16 are coupled further by a support structure having a bending rigidity which comprises support rods 21, 27 and 22, 28 for fitting slidably together coupled portions of the flexible beams 11, 13 and 12, 14 and the holding box 26, the holding box 26 is placed in position and so retained at the turnbuckle shaft 25 by snap rings 31, 32, and the support rod 27 and 28 and the holding box 26 are supported straight on the axis. Support rods 21 and 22 comprise first coupling members and support rods 27 and 28 comprise second coupling members slidably connected to the first coupling members. Accordingly, a buckling strength against compressed loads applied to the pitch link 9 by way of the spherical bearings 19 and 20 presents a buckling mode as indicated by a broken line in FIG. 7 as compared with the case where there is no support available by the support rods 21, 22, 27 and 28 and the holding box 26, and thus is large as compared with the buckling mode indicated by a full line as in the case mentioned above. Further, in the unlikely event that one of the four flexible beams 11, 12, 13, 14 is damaged, a load can be supported by the remaining flexible beams and the support rods 21, 22, 27, 28 and the holding box 26, and the flexible beams 11, 12, 13, 14 are made of a composite material to have a high redundancy and are retardant of developing a damage due to a load applied repeatedly during the flight, thus ensuring a high safety of flight.

A coupling structure of the support rods 21, 22 and the diamond-shaped frame and the spherical bearing 19 will be described with reference to FIGS. 8A and 8B. The diamond-shaped frame vertex portion 15 on an upper side having the spherical bearing 19 has the support rod 21 extending vertically of the axis therein with a composite material fiber 41 built up on a core 40 concave outside and the spherical bearing 19, and composite material fibers 43 and 44 wound further thereon to fixation.

The vertex portion 16 of the diamond-shaped frame has a central tapped hole and a composite material fiber 41 built up on a mortar-shaped core 42 having a concave exterior. A composite material fiber 47 is further wound around composite material fiber 41 for reinforcement. The spherical bearing 20 is screwed into one end of a member having a rod end 10 (FIG. 3A) at one end thereof and support rod 22 at the other end thereof. A male screw on the outer surface of this member is screwed into the tapped hole of the core 42, and then the member is locked by a lock nut 39.

Besides, the vertex portions 17 and 18 of the diamond-shaped frame coming on a diagonal line orthogonal to the axis have the composite material 41 built up on a core 45 threaded inside and concave outside, and a composite material fiber 46 wound further thereon to reinforcement.

The four vertex portions 15, 16, 17 and 18 of the diamond-shaped frame and a junction of the spherical bearing 19 are reinforced, as described above, by composite material fibers, and hence are free from interlayer separation, hard to damage, stiff accordingly, and further the nuts 23 and 24 can be fitted solidly.

For holding the turnbuckle shaft 25 so as to locate its central portion in position at the center of the pitch link 9, as shown in FIG. 3A, after passing through a hole of the pair of cores 45 and the holding box 26, the turnbuckle shaft 25 is passed through the hole of the cores 45 and the holding box 26 and the center hole of the wheel 33 and thus is supported at a predetermined position, then the nuts 23 and 24 threaded both internally and externally are screwed from opposite ends of the turnbuckle shaft 25, the outside thread is screwed into an inside tapped hole of the cores 45 to fixation, a lock nut 29 is screwed into the opposite ends of the turnbuckle shaft, and for prevention of its coming off, a snap ring 30 is mounted to the turnbuckle shaft on an outside of the lock nut 29. Thus, the diamond-shaped frame of the pitch link 9 is restricted from being extended and contracted excessively crosswise, and the pitch link is prevented from being damaged by excessive adjustments. Further, the lock nut 29 is tightened and fixed against the nuts 23 and 24 barring the case where the pitch link length is adjusted, thereby enhancing a safety of flight.

Meanwhile, for locating the turnbuckle shaft 25 in position with reference to the holding box 26, the snap rings 31, 32 are mounted to the turnbuckle shaft on opposite sides of a through hole of the holding box, and also for locating the worm wheel 33 in position and so fixed to the turnbuckle shaft 25, the center hole of the worm wheel and the turnbuckle shaft are fixed by key or other suitable means.

As described hereinabove, the rod end 10 provided on a lower end of the pitch link 9 is screwed into an internal thread of the core 42 and is ready for fixing by the lock nut 39. In case the length of the pitch link length must be adjusted in excess of a predetermined range, such as two thread lengths or less of the rod end 10, in which range adjustment can be performed by rotation of the turnbuckle shaft 25 with no effect on flight safety, the rod end 10 is rotated by at least one half rotation at a time to perform coarse adjustment of the pitch link length. Fine adjustment is then performed by rotating the turnbuckle shaft 25.

The rod end 10 is screwable and rotatable, therefore a mounting angle of the upper and lower spherical bearings 19 and 20 can be positioned properly, and further it is easily replaceable, and hence from positioning the rod end 10 to the side where the spherical bearings are severely worn out or damaged, practicability will reasonably be enhanced.

Described next is one example of automatic adjuster for adjusting automatically a length of such pitch link as exemplified above which is ready for adjusting its length by driving means capable of remote control like an electric motor.

The automatic adjuster comprises, as main components, a vibrosensor for detecting vibrations of an aircraft body, a phase detector for detecting rotor phases, a vibration analyzer, an FM data transmitter/receiver, and a pitch link length adjusting means including a motor.

As shown in FIG. 1 and FIG. 2, a vibrosensor 1 is mounted within the body of a helicopter, a phase detector 3 for detecting the rotational position of the rotors with respect to a reference position is mounted to a static ring 2 of a swash plate, a vibration analyzer 4 for, calculating an amount of adjustment of each pitch link 9 from electrical signals indicating vibrations and rotor rotational position relative to a reference position each is placed within the helicopter body, and an FM data transmitter 5 is mounted to the static ring 2 of the swash plate. A motor controller 7 having an FM data receiver 6 and an automatic control circuit for driving the electric motor 36 by a rate according to an electrical signal received from the FM data receiver 6 is mounted to a rotating ring 8 of the swash plate.

Figure 4:
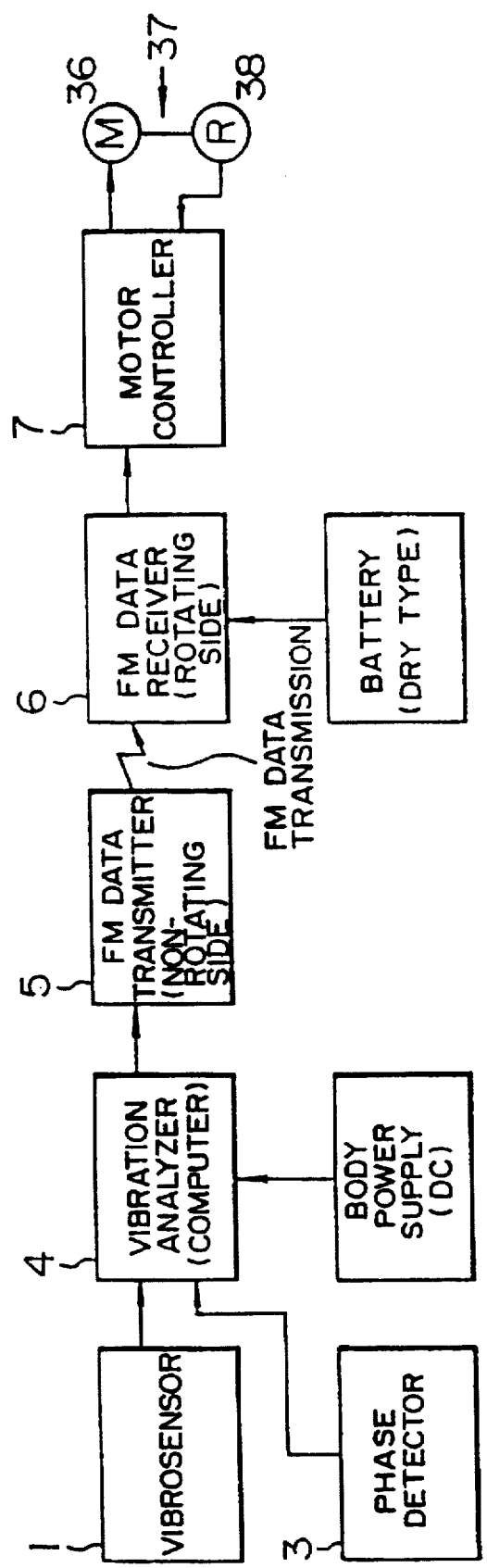
FIG. 4 is a control block diagram of a pitch link automatic adjuster according to the present invention.

As shown in FIG. 4, the vibrosensor 1, the phase detector 3 and the FM data transmitter 5 are connected each electrically to the vibration analyzer 4, and the FM data receiver 6, the electric motor 36 and the rotational frequency detector 38 are connected each electrically to the motor controller 7.

An amount of adjustment of each pitch link is calculated by the vibration analyzer 4 from electrical signals detected by the vibrosensor 1 and the phase detector 3, which is transformed into an electrical signal and sent to the FM transmitter 5, the electrical signal being transformed into an FM radio wave by the FM data transmitter 5. The FM radio wave is received by the FM data receiver 6, where it is retransformed into an electrical signal and input to the motor controller 7. The electric motor 36 is driven by the rate according to input signals by the automatic control circuit comprising the rotational frequency detector 38 and the motor controller 7, and thus, for example, the turnbuckle shaft 25 of the pitch link 9 shown in FIGS. 3A, 3B and 3C is rotated, and a length of the pitch link is adjusted automatically and precisely.

Figure 5:
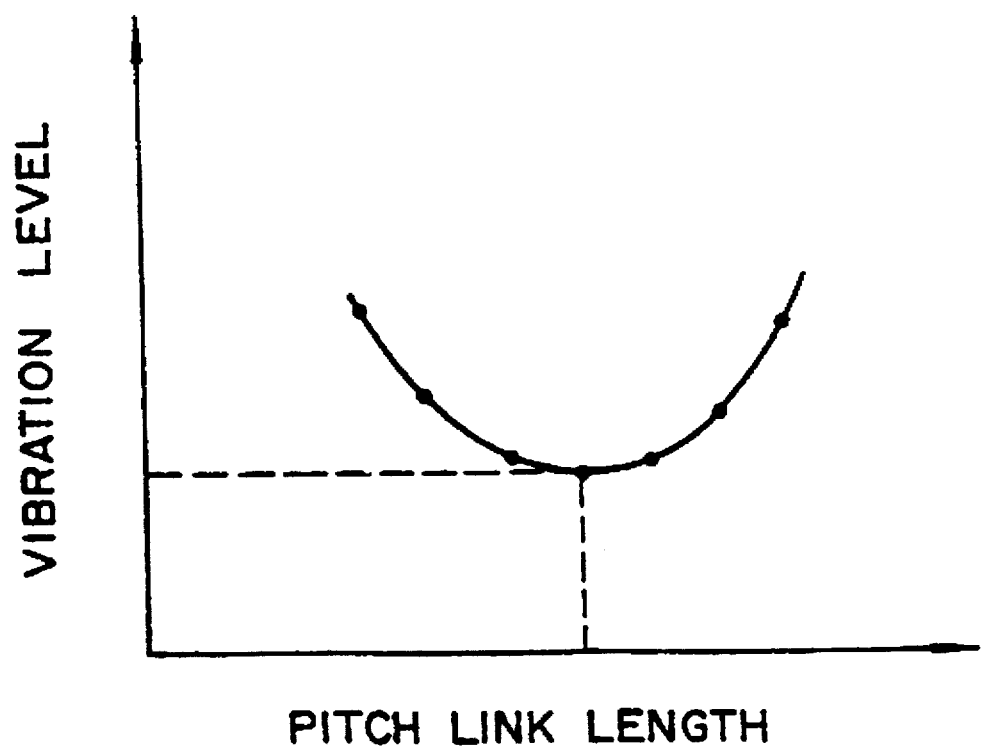
FIG. 5 is a curve indicating a correlation between a relative difference of a pitch link length and a body vibration level.

A vertical vibration of the helicopter is caused particularly by an unbalanced dynamic lift of the rotor blade 55, which is adjusted by controlling a length of the pitch link 9, and hence such rotor blade as is taken most influential is calculated from waveform and phase of the body vibration detected by the vibrosensor and the phase detector 3, and from adjusting the pitch link length of the rotor blade little by little by means of the automatic adjuster according to the invention, a vibration level corresponding thereto is detected by the vibrosensor 1, the pitch link length whereat the vibration level is minimized as shown in FIG. 5 is calculated by the vibration analyzer from data obtained as above, thereby adjusting to such length. For other pitch links, the pitch link length whereat the vibration level is minimized is calculated likewise to adjust the pitch links to such length. The body vibration is reduced by repeating such process several times. Control rules such as adjusting steps necessary therefor and others are stored in the vibration analyzer, and thus the length of each pitch link is controlled automatically during flight so as to minimize the body vibration according to the control rules.

A length of the pitch link 9 can be adjusted during flight according to the adjuster of the invention, and moreover a length of the pitch link 9 can be controlled continuously on automatic control according to the control rules preset, therefore the pitch links can be adjusted to .an optimum length against arbitrary flying conditions, thus sharply lowering the vibration level. That is, the pitch links are subjected to a fine adjustment automatically to an optimum length during the one-time flight, therefore a uniform vibration level is obtainable without being influenced by the difference in skill of ground men, and in addition a sharp decrease of cost and an abridgement of schedule will be realizable.

<Second Example>

Figure 9:
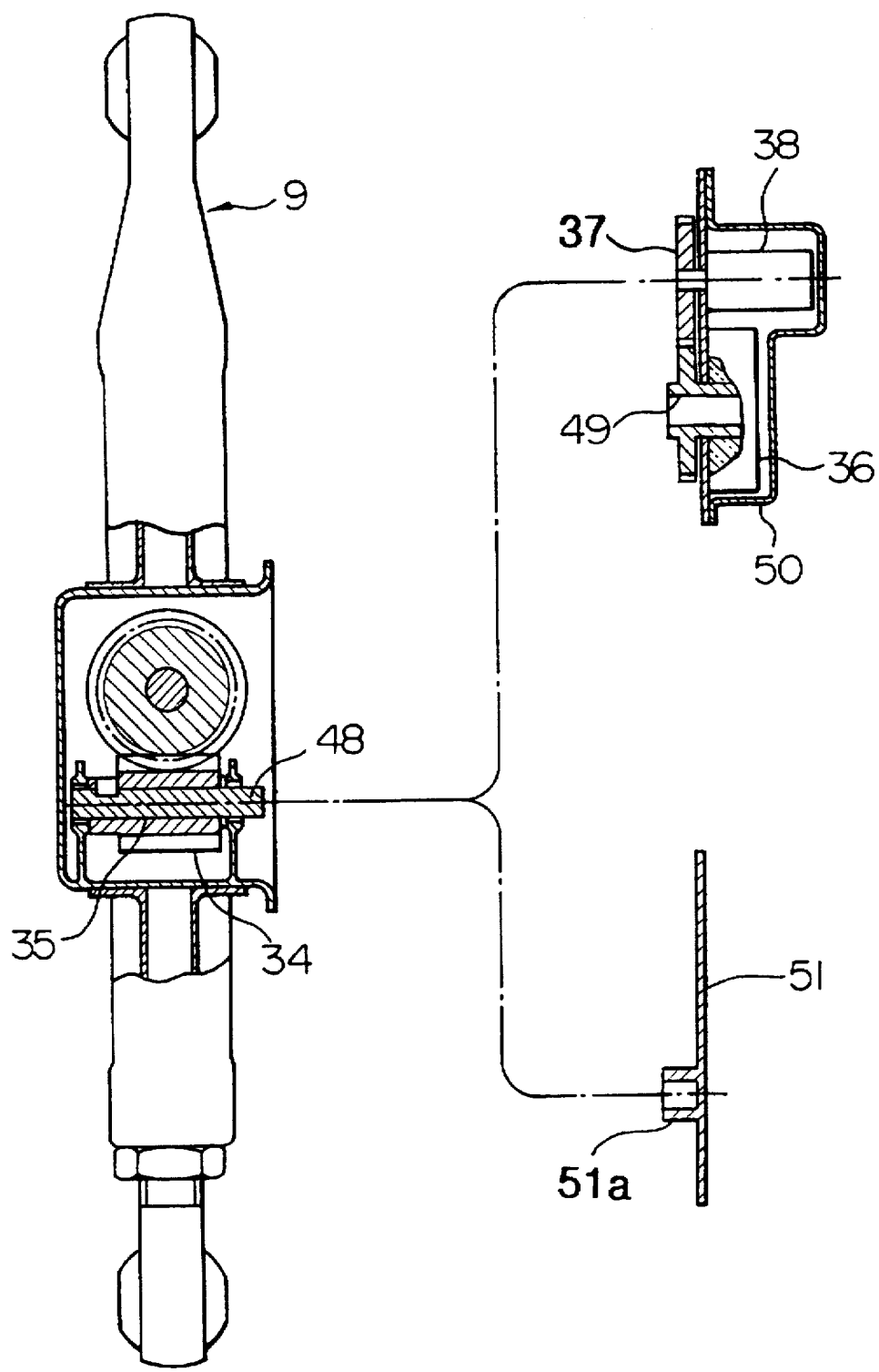
FIG. 9 is an explanatory drawing illustrating a second example of the pitch link of the present invention.

As shown in FIG. 9, a module unit is obtained from integrating the electric motor 36 coupled to a spline 48 of the worm shaft 35 of the pitch link 9 and the rotational frequency detector 38 coupled to a shaft of the electric motor 36 through a pair of gears 37, and after a vibration adjustment is completed, the module unit 50 is demounted through a spline 49, and a cover 51 having a spline 51a fittable on the spline 48 of the worm shaft 35 is mounted in place of the module unit 50. Thus, a rotation of the worm 34 is fixed, and a length of the pitch link is perfectly locked, thereby enhancing a safety of flight.

The electric motor 36 and the rotational frequency detector 38 functioning for particular purposes are mounted to the pitch link 9 only when a length of the pitch link is adjusted, and are demounted otherwise at the time of normal operation, therefore a requirement of high reliability for the aircraft equipment is not particularly applied thereto and they come to be handled as merely ground backup equipment in consequence, thus minimizing a development cost and shortening a period of time required for development. Additionally, these vibrosensor 1, vibration analyzer 4, FM data transmitter/receiver 5, 6 and motor controller 7 functioning particularly for the pitch link adjuster are demounted accordingly at the time of normal operation where adjustment of vibrations is not necessary, therefore a high reliability is not required likewise, and they also come to be handled as ground backup equipment, and thus even in case a plurality of aircraft bodies are operated practically, the adjuster may be provided in one complete set only, thereby reducing the cost.

<Third Example>

The pitch link constructed to work as a diamond-shaped frame which comprises having its length adjusted by extending or contracting its lateral, diagonal line by means of turnbuckle shaft is available for application to an automatic adjuster, and is also ready for manual adjustment small in dispersion on a small force. A construction of the pitch link suitable thereto will then be described as a third example and a fourth example.

Figure 10A:
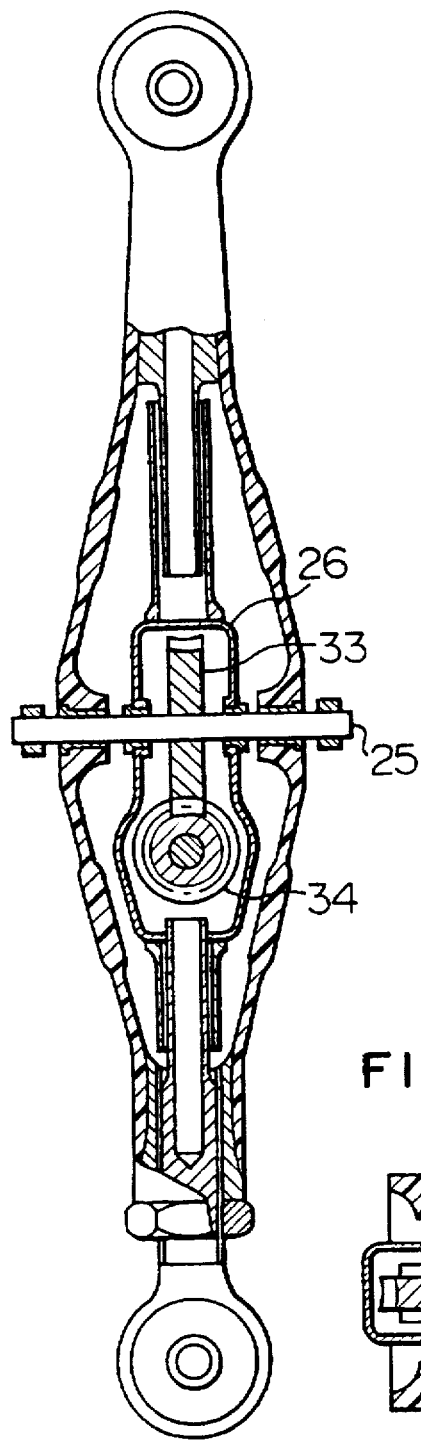
Figure 10B:
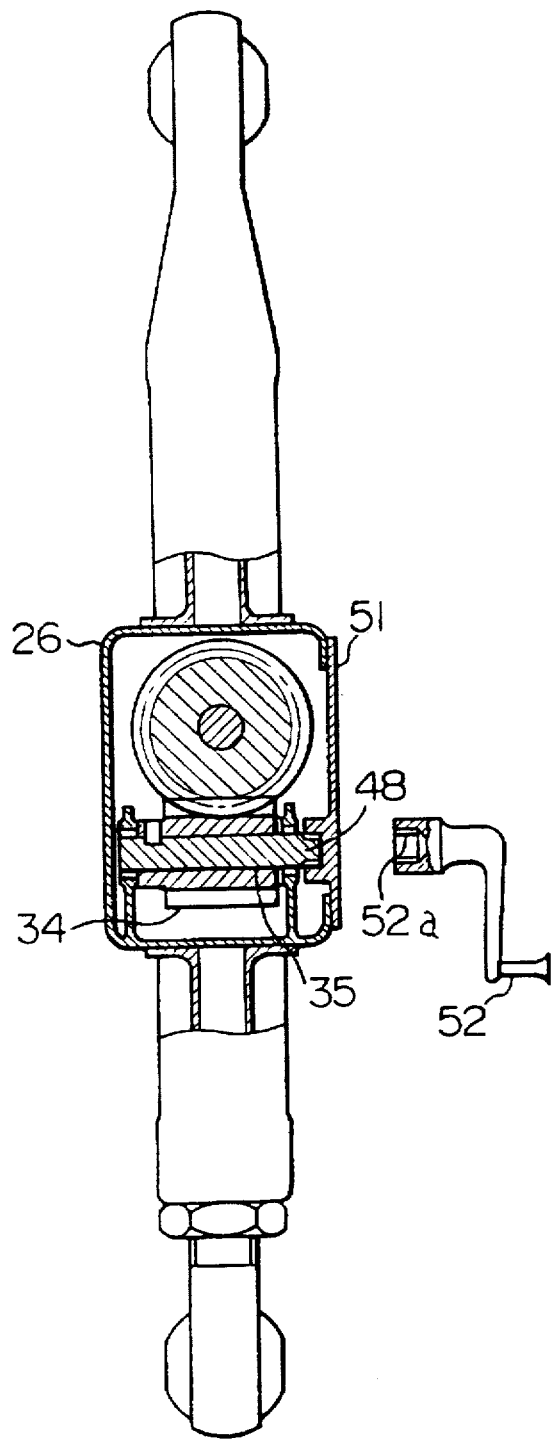
Figure 10C:
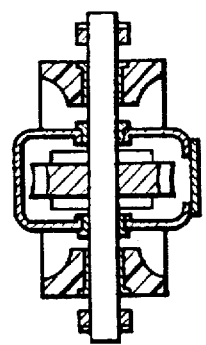
Figure 12:
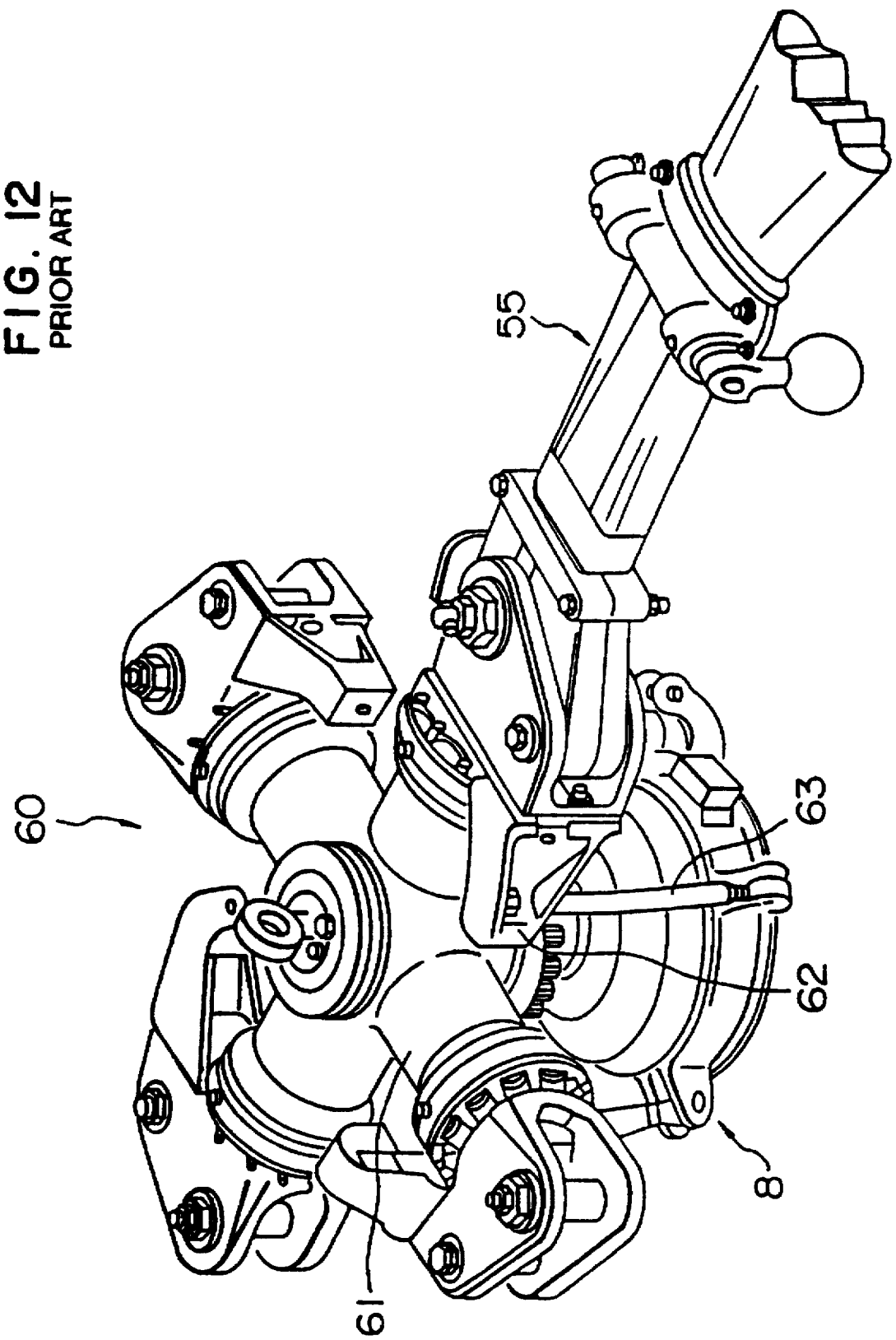
FIG. 12 is a perspective view illustrating how to mount the pitch link.

In the third example shown in FIGS. 10A, 10B and 10C, the wheel 33 is mounted to the turnbuckle shaft 25, the wheel 33 is engaged, and the worm 34 is mounted to the worm shaft 35 having a spline to fixation, and the cover 51 having the spline 49 fitted in the spline of the worm shaft 35 is fixed detachably to the holding box 26.

For adjusting a length of the pitch link, the cover 51 is demounted, a handle 52 having a spline 32a fitted on the spline 48 of the worm shaft 35 is mounted and turned by hand, and the turnbuckle shaft 25 is driven through a worm gear reduction mechanism constructed of the worm 34 and the wheel 33.

After the adjustment is completed, the handle 52 is demounted, and the cover 51 is remounted and fixed to the holding box 26 by coupling to the spline of the worm shaft 35.

The pitch link can be adjusted precisely on a small force by the aforesaid worm gear reduction mechanism constructed of the worm 34 and the wheel 33, the turnbuckle shaft 25 is prevented from rotating on its axis as well, and after the adjustment is completed, from remounting the cover 51, a rotation of the worm 34 is locked to form a perfect lock motion, therefore a high safety of flight is ensured thereby.

<Fourth Example>

In this example, as shown in FIGS. 11A, 11B and 11C, instead of using the worm gear reduction mechanism for rotations of the turnbuckle shaft, hexagonal holes 53 are provided on opposite ends of the turnbuckle shaft 25, and when adjusting the pitch link length, the lock nut 29 is loosened until it comes close to the snap ring 30, a hexagonal wrench 54 is fitted in the hexagonal holes 53 on opposite ends of the turnbuckle shaft 25, and the turnbuckle shaft 25 is turned as necessary by the hexagonal wrench 54 to adjust the pitch link length. After the adjustment is completed, the lock nut 29 is retightened and fixed.

<Fifth Example>

Next, an example of the automatic adjustment of a pitch link length which is capable of decreasing further the vibration level of an aircraft will be described as per fifth example. An amount of adjustment for a trim tab 56 (FIG. 1) of a rotor blade 55 is calculated from an amount of adjustment of the pitch link at the time of hovering and high-speed flight, an angle of the trim tab 56 is adjusted, and then the length of the pitch link is readjusted, thereby decreasing further the vibration level.

Besides, three examples having such a construction that a bearing is provided extendedly on the axis connecting rod ends on opposite end portions of a pitch link, a pair of shaft members are provided which are screwed each other by a screw mechanism with the aforesaid bearing as a shaft center, and the one shaft member is rotated by an electric motor through a mechanical reduction mechanism, thereby adjusting the pitch link length will be described as per sixth example, seventh example and eighth example.

<Sixth Example>

FIG. 14 is an illustration showing a construction of a sixth example. As shown in FIG. 14, a pitch link of this example has a construction wherein a first shaft member in the form of a nut tube (inner tube) 72 having a female screw on an inside of opposite end portions of the tube and a spline 73 on an outer peripheral surface of a lower end portion is coupled to internal spline 74A of a guide tube (outer tube) 74, a male screw 76 on the outer periphery of a second shaft member in the form of a jack screw 75 coupled to a toothed wheel 78 is screwed into the female screw 72a on the lower end portion of the nut tube 72, an electric motor 80 with a rotational frequency detector is coupled to the toothed wheel 78 through a mechanical reduction mechanism 79, a rod end 70 is screwed into another female screw 84 of the nut tube 72 and then locked by a lock nut 71. The jack screw 75 is supported rotatably on the guide tube 74 and a support 82 through ball bearings 77 and 81, and a rod end 83 is coupled to the support 82. A spherical bearing 69 is mounted on each rod end 70 and 83.

The electric motor 80 is driven, the jack screw 75 is rotated through the mechanical reduction mechanism 79, and the nut tube 72 is brought into a direct action in the direction of spindle, thereby adjusting a length of the pitch link.

<Seventh Example>

Figure 15:
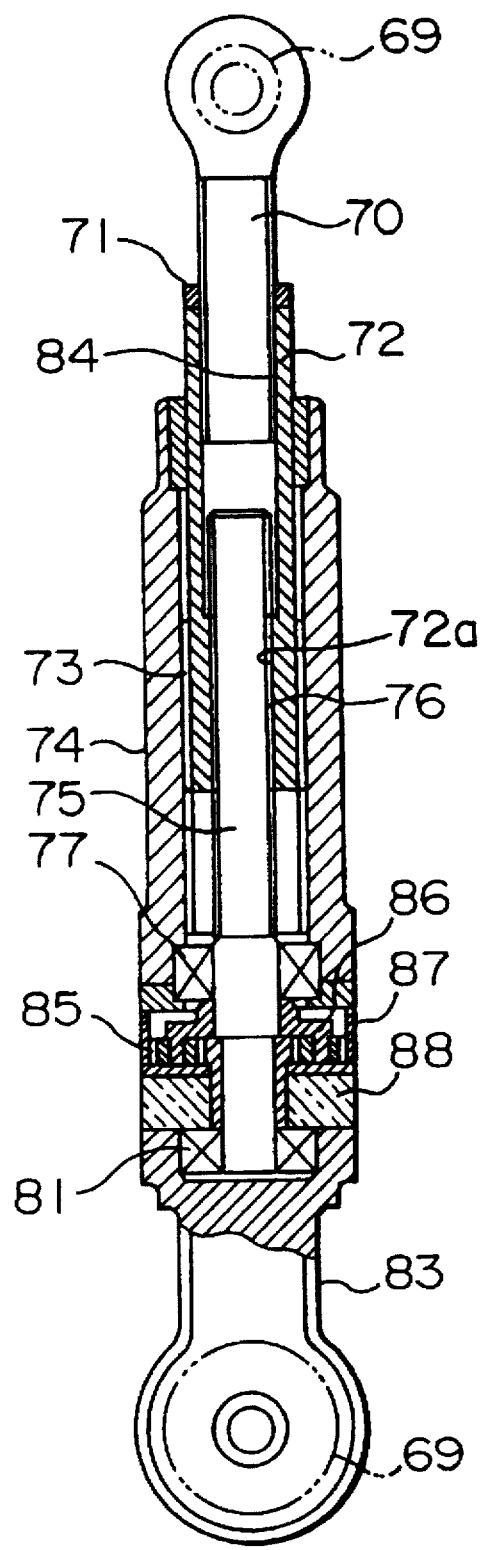
FIG. 15 is a longitudinal sectional view representing a seventh example of the pitch link of the present invention.

As shown in FIG. 15, the first shaft member in the form of the nut tube (inner tube) 72 having the female screws 72a and 84 on an inside surface of the opposite end portions each and the spline 73 on an outer peripheral surface of the lower end portion is fitted in the guide tube 74 having a spline inside through the spline 73.

The male screw 76 on the outer periphery of the second shaft member in the form of the jack screw 75 which is fixed to a carrier 86 of an epicyclic gear reduction mechanism 85 is screwed into the female screw 72a on the lower end portion of the nut tube 72.

The electric motor 80 with a rotational frequency detector is coupled coaxially onto the spindle through the epicyclic gear reduction mechanism 85.

The rod end 70 is screwed into the other female screw 84 of the nut tube 72 and locked by the lock nut 71. Supported on the ball bearings 77 and 81, the guide tube 74, ring gear 87, electric motor 88 and rod end 83 are piled up and fixed.

The electric motor 88 is driven, the jack screw 75 is rotated through the epicyclic gear reduction mechanism 85, and the nut tube 72 is brought into a direct action in the direction of spindle, thereby adjusting the pitch link length.

<Eighth Example>

Figure 16:
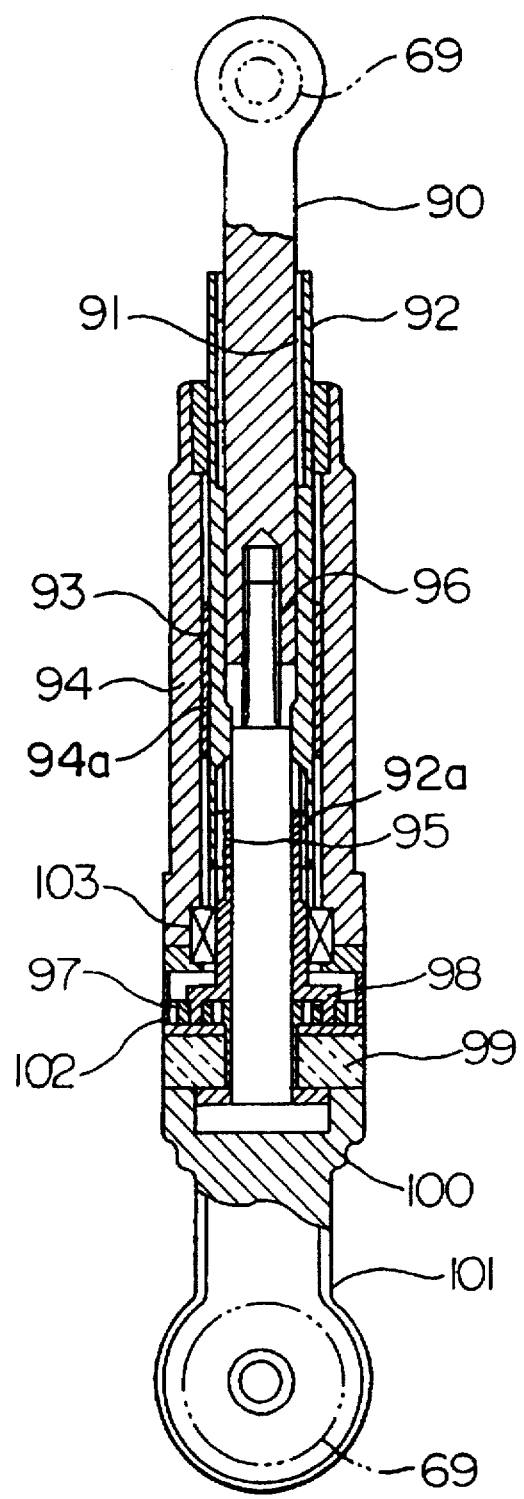
FIG. 16 is a longitudinal sectional view representing an eighth example of the pitch link of the present invention.

As shown in FIG. 16, a nut tube 92 having two sets of screws 93 and 91 same in the spiral direction but different in pitch on the outer peripheral surface and the inside surface respectively and a spline 95 on the inside surface of one end portion is screwed into a support tube 94 having a female screw 94a on its inside surface.

A carrier 98 of an epicyclic gear reduction mechanism 97 having a spline 95 on one end is fitted in the spline 92a of the nut tube 92, and an electric motor 99 is coupled thereto through the epicyclic gear reduction mechanism 97. The carrier 98 is supported on the support tube 94 through a ball bearing 103.

The rod end 90 having the male screw 91 on an outer peripheral surface of the shaft and a spline 96 on an inner peripheral surface of the end portion is screwed into the female screw 91 of the nut tube 92.

A shaft 100 having the spline 96 on an outer peripheral surface of its one end and a flange on the other end is fixed to a rod end 101, the spline 96 is then fitted therein through a center of the carrier 98, thus supporting the rod end 90 so as not to turn.

The support tube 94, a ring gear 102 of the epicyclic gear reduction mechanism, the electric motor 99 and the rod end 101 are piled up and fixed.

The electric motor 99 is driven, the carrier 98 is rotated through the epicyclic gear reduction mechanism, and the nut tube 92 coupled by the spline 95 is rotated.

The support tube 94 and the rod end 90 is constrained for rotation by the spline 96 through the shaft 100, and the nut tube 92 and the support tube 94 are joined together by the screw 93, therefore if the nut tube 92 is rotated, it comes into a direct action on the spindle, and further the nut tube 92 is joined to the rod end 90 by the screw 91, therefore the rod end 90 is brought into a direct action by an angle of lead of the screw 91 with reference to the nut tube 92.

Since the screw 93 and the screw 91 are of the same spiral direction, from rotating the nut tube 92 in the direction where the nut tube 92 projects from the support tube 94, the rod end 90 is brought into a direct action by the screw 91 in the direction where it is drawn into the nut tube 92.

The two sets of screws 93 and 91 are same in the spiral direction but different in pitch, therefore the total of moves per rotation of the nut tube is a difference in pitch of the two sets of screws 93 and 91. That is, if the nut tube 92 is rotated, then a length of the pitch link is adjusted by the difference in pitch of the screw 93 and the screw 91 per rotation thereof. The nut tube 92 thus functions as a differential screw mechanism.

Accordingly, a length of the pitch link can be adjusted more minutely from minimizing the difference in pitch of the screw 93 and the screw 91.

A pitch link load working on a large-sized helicopter is large, and a degree of influence of a lost motion of the pitch link which may exert on a body vibration is smaller than that of a small-sized helicopter.

That is, a pitch link of the large-sized helicopter for automatic adjustment will be optimized by the sixth to eighth examples in which a driving force is amplified by using a mechanical reduction mechanism.

According to one aspect of the invention, the pitch link is free from lost motion as it is constructed to form a diamond-shaped frame for which the four flexible beams are coupled each other to fixation at end portions thereof, and with the diagonal line connecting a pair of opposite acute vertexes as an axis of the pitch link, a length of the horizontal diagonal line is adjusted by a turnbuckle shaft for the pitch link length, thus realizing a fine adjustment.

According to another aspect of the invention, since a pair of acute vertexes of a diamond-shaped frame which constructs the pitch link are coupled by a rod support member having a bending rigidity and expansible, a buckling strength against compressive loads of the pitch link is high, and thus even in case one of the flexible beams is damaged, the remaining flexible beams and the support member are capable of supporting the load, thereby ensuring a high safety of flight.

According to a further aspect of the invention, the pitch link is made of composite materials to a solid structure, therefore a damage resultant from a repeated load during flight is retardative of propagating further, and since its redundancy is high, a high safety of flight will be ensured.

According to another aspect of the invention, at least one of the rod end with spherical bearing is screwed in the diamond-shaped frame, therefore by turning it the pitch link length may be roughly adjusted, and an amount of adjustment by changing the diamond shape may be minimized, thus preventing the pitch link from being damaged by changing the shape excessively.

According to another aspect of the invention, the turnbuckle shaft for adjusting the pitch link length is rotated through a worm gear reduction mechanism, therefore the turnbuckle shaft will never rotate independently, and the length may be adjusted precisely on a small force.

According to a further aspect of the invention, after a vibration adjustment is completed, the electric motor is demounted and a cover with which a spline fittable in the spline on a worm shaft end is fixed is mounted, thus the worm shaft is locked securely to enhance a safety.

According to yet another aspect of the invention, an automatic adjustment of the pitch link of a large-sized helicopter with a large load can be carried out smoothly. :

According to a further aspect of the invention, since an adjustment of the pitch link length can be performed continuously on an automatic control during flight, the pitch link can be set to an optimum length at one-time flight for arbitrary flying conditions, thus realizing a sharp reduction of cost and an abridgement of schedule.

According to still another aspect of the invention, after a vibration adjustment is completed, functional members such as electric motor, rotational frequency detector, vibrosensor, vibration analyzer, FM data transmitter/receiver and so forth are remounted from the pitch link and the aircraft, and these parts come to be handled consequently as ground support equipment, for which a high reliability normally required to the aircraft equipment is not particularly required, thus sharply reducing a cost of system development and period of time necessary therefor.

(Industrial Applicability)

The present invention ensures a completion of pitch link adjustment at one-time flight to arbitrary flying conditions by carrying out the pitch link adjustment automatically and continuously during flight. Further, an automatic adjustment of the pitch link can be effected smoothly for a large-sized helicopter with a large load on the pitch link and less degree of an influence of a lost motion of the pitch link exerting on body vibrations.

We claim:

1. A pitch link for a rotary wing aircraft comprising:

a diamond-shaped frame having first and second opposing acute vertex portions and first and second opposing obtuse vertex portions and comprising four flexible beams coupled to each other at end portions of the beams;

first and second spherical bearings mounted on the first and second acute vertex portions, respectively; and a turnbuckle shaft having bilateral threads connected to the first and second obtuse vertex portions.

2. A pitch link according to claim 1 including two first coupling members connected to the first and second spherical bearings, respectively, and two second coupling members each connected to the turnbuckle shaft and each slidably connected to a respective one of the first coupling members for relative sliding movement in an axial direction of the pitch link.

3. A pitch link according to claim 1 wherein the pitch link comprises a composite material.

4. A pitch link according to claim 1 wherein one of the two spherical bearings is wound with a composite material fiber and fixed to the diamond-shaped frame.

5. A pitch link according to claim 2 wherein one of the first coupling members has a male screw formed thereon, the pitch link further comprising a mortar-shaped core material which has a female screw into which female screw the male screw is threaded and which is laminated with a composite material fiber and then wound with a composite material fiber thereon for reinforcement.

6. A pitch link according to claim 5 wherein a maximum pitch link length adjustment by the turnbuckle shaft corresponds to not more than two thread lengths of the male screw.

7. A pitch link according to claim 1 including a worm gear reduction mechanism drivingly connected to the turnbuckle shaft.

8. A pitch link according to claim 7 including an electric motor for rotating and driving the turnbuckle shaft, the motor being coupled detachably to a worm shaft of the worm gear reduction mechanism.

9. A pitch link according to claim 8 wherein the pitch link includes a cover having a spline adapted for spline engagement with the worm shaft to prevent rotation of the worm shaft when the motor is detached from the worm shaft.

10. A pitch link according to claim 1 wherein one of the spherical bearings is connected to a blade of the aircraft so as to rotate the blade about a pitch axis and the other spherical bearing is connected to a rotating ring of a swash plate of the aircraft.

11. A pitch link according to claim 1 wherein the flexible beams have equal length and rigidity.

* * * * *